Feb. 23, 1971 R. KNOLL ET AL 3,564,692

METHOD AND APPARATUS FOR OPTICALLY MARKING THE TERMINALS OF A JUNCTION PANEL WHICH ARE TO BE CONNECTED

Filed Sept. 23, 1968 6 Sheets-Sheet 1

Inventors:
Rudolf Knoll
Peter Knoll
By Spencer & Kaye
Attorneys

Inventors:
Rudolf Knoll
Peter Knoll
By Spencer & Kaye
Attorneys

Inventors:
Rudolf Knoll
Peter Knoll
By Spencer & Kaye
Attorneys

Inventors:
Rudolf Knoll
Peter Knoll
By Spencer & Kaye
Attorneys

Inventors:
Rudolf Knoll
Peter Knoll
By Spencer & Kaye
Attorneys

Inventors:
Rudolf Knoll
Peter Knoll
By Spencer & Kaye
Attorneys

United States Patent Office 3,564,692
Patented Feb. 23, 1971

3,564,692

METHOD AND APPARATUS FOR OPTICALLY MARKING THE TERMINALS OF A JUNCTION PANEL WHICH ARE TO BE CONNECTED

Rudolf Knoll, Ulm (Danube) and Peter Knoll, Nattheim, Germany, assignors to Telefunken Patentverwertungs-gesellschaft m.b.H., Ulm (Danube), Germany
Filed Sept. 23, 1968, Ser. No. 763,052
Claims priority, application Germany, Feb. 24, 1968, P 16 90 348.3; Aug. 29, 1968, P 17 90 024.2
Int. Cl. H05k 13/00, 3/30
U.S. Cl. 29—203 54 Claims

ABSTRACT OF THE DISCLOSURE

A method and apparatus for optically marking individual terminals of a junction panel to visually indicate the terminals that are to be wired. The method and apparatus, which effects the marking in such a way that the optical markings cannot be intercepted by either the hands of the person wiring the junction panel or the wires previously connected, includes the steps of, or means for, viewing, via at least one partly reflective mirror, the junction panel or an image thereof and superimposing on the view or image of the junction panel an image of the optical markings cannot be intercepted by either the view or image of at least one of the terminals which is to be electrically connected.

BACKGROUND OF THE INVENTION

The present invention relates to a method and apparatus for assisting in the production of electrical connections between individual terminals of a junction panel having a plurality of terminals. The method and apparatus involves the simultaneous or successive generation of optical markings which indicate the terminals of the panel which are to be connected with each other.

Junction panels having a large number of terminals are commonly used, for example, in electronic computers. The terminals in these panels may, for example, be plug sockets or soldering lugs. Panels of this type are often formed by the socket side of contact strips which are designed to hold plug-in units or cards.

In the past, the individual terminals of a junction panel were commonly connected together by a person using written instructions. The person obtained information about an individual connection within the panel from the instructions and executed the instructions by finding the designated terminals and making the connection. This prior art method was not only inconvenient but time-consuming and, in practice, repeatedly resulted in incorrect connections. When this method is used, it has therefore been necessary to provide an additional person who checks to insure that the connections so made have been made correctly. Although this technique of quality control brings the frequency of error within acceptable limits, it requires still further time and expense.

The U.S. Pat. No. 2,805,471 discloses a technique for assisting in the manufactutre of a wiring harness. In this case, the paths of the individual wires are successively projected on the lug-covered cable shelf on which the individual wires must be laid. The projected images are produced by slides or sections of movie film. The disadvantage of this known type of marking method is that the markings so generated can be temporarily and partly covered by the wires which have already been laid and/or the hands of the attendant person. This makes it difficult to make a connection, particularly when the method is employed to mark only the end points of wires on a panel which is criss-crossed by a large number of connecting wires.

It is also already known in the art to assist in attaching circuit elements to a printed circuit board by projecting an image of the individual elements onto the board at their proper location. This technique, which is disclosed in the U.S. Pat. No. 2,906,016, is also subject to the disadvantages noted above.

Finally, it is also known to mark the individual holes or openings in a printed circuit board, which serve as the circuit element terminals, by illuminating the side of the holes opposite the observer with colored lights. This technique of assisting the placement of the circuit elements on the printed circuit board, which is disclosed in the U.S. Pat. No. 2,959,848, may only be used where the terminal holes pass entirely through the panel. In addition, even the markings produced in this way can be covered by the hands of the operator or the wires and circuit elements on the printed circuit board. This is especially true when the method is employed to produce marks on a panel which is criss-crossed by a large number of connecting wires.

SUMMARY OF THE INVENTION

An object of the present invention, therefore, is to find a method and apparatus for assisting in producing electrical connections between individual terminals of a junction panel which has a large number of terminals, wherein the terminals to be connected are optically marked in such a way that the markings will not be covered either by the hands of the attendant person or by the wires which have already been connected.

This object, as well as other objects which will become apparent in the discussion that follows, is achieved, according to the present invention, in either of two ways. In one instance this object is achieved by providing either the steps of, or means for, viewing the junction panel through a partly reflective mirror and superimposing, on this view of the junction panel, the image of an optical marking. In the second instance, there is provided the steps of, or means for, viewing an image of the junction panel in a substantially wholly reflective mirror and superimposing, on this image of the junction panel, the image of the optical marking. In both cases, the optical markings are chosen to substantially coincide with the view or image of at least one of the terminals of the junction panel which is to be electrically connected.

Compared with the techniques which are known in the prior art and described above in the "Background of the Invention," the method and apparatus according to the present invention permits a considerable simplification—and thus a reduction in cost—in the process of wiring junction panels. In addition, the method and apparatus according to the present invention effects a considerable reduction in the frequency of occurrence of incorrect connections. The optical markings generated by the method and apparatus of the present invention are visible to the person making the wire connections, not only during the wiring process, but also when the actual connecting point is itself covered by wires. After the terminal to be connected is exposed, the image of the optical marking will be superimposed either on this terminal or on its image.

It is suitable to employ the method and apparatus of the present invention only when it is necessary to make connections of a number of identical junction panels, each having a large number of terminals. Only then can the expense be justified of placing the data for the various markings in a suitable control unit.

It is advantageous if the optical markings used in the method or apparatus of the present invention be formed as illuminated spots.

In addition to marking the terminals to be connected, it is possible, according to a further feature of the present invention, to optically mark one of a plurality of bins, each of which contains a supply of wires of a particular length for the connection of the terminals of the junction panel. The bin that is marked will contain the wire having the proper length for connection to the terminal that is next to be connected. Reference is made, in this connection, to the German Pat. No. 1,238,978 which describes apparatus for assisting in the application of circuit elements to printed circuit boards and the like. It is suggested in this patent that various bins be provided to store the circuit elements and, that as the circuit board is marked, that bin is also marked which contains the associated circuit element.

It is possible also to employ the method and apparatus according to the present invention to additionally mark various points of the path of a connecting wire, such as the points where it crosses other wires, the points where it is bent, etc. The marking of these kinds of points is of special interest in the production of wiring harnesses. Furthermore, it is possible to utilize the method and apparatus according to the present invention to assist in placing electrical and mechanical circuit elements on a circuit chassis. The chassis may be of the conventional type, made of metal, or a printed circuit board, or the like. In this case, it may be advantageous, for example, to mark all the points on the circuit chassis—e.g., the printed circuit board—which are to be provided with a particular circuit element—e.g., a transistor. In this case also, if the circuit elements are stored in bins, the particular bin that contains the particular circuit element for which the chassis is marked can also be marked in the manner described in the above-noted patent.

The terminals which are to be connected may be marked in a number of different ways. The device for producing the optical markings may, for example, include an orifice plate arranged parallel to and facing the junction panel and provided with a number of apertures situated at points which correspond to the positions of the terminals to be marked. Light is selectively passed through these apertures in a direction perpendicular to the plane of the plate to mark the individual terminals. Though in the simplest case only two terminals of a junction panel must be connected together, it may also be necessary to mark the connections of a large number of terminals, either simultaneously or in succession. After every connection or series of connections is made, the device for producing the optical markings may be controlled—for example, by a programmed control device—to pass light through different apertures.

According to a particular embodiment of the device for producing the optical markings according to the present invention, the orifice plate is arranged in a position facing the junction panel and each of the apertures in the orifice plate is arranged in a position facing one of the terminals of the junction panel which are to be marked. The device is also provided with a number of small electric lights or lamps, one of which is arranged in or behind each of the apertures, and a means for selectively applying a voltage to individual ones of the lamps to illuminate those which are associated with the terminals to be marked. If the terminals of the junction panel and, in turn, the apertures and lamps are arranged in columns in rows, it may be advantageous to apply a voltage to all of the lamps in the column and row associated with the terminal to be marked so that the point which is marked is designated by the point at which the lights of a row cross the lights of a column. This arrangement has the advantage that the terminal, which is to be connected, will always be marked even though one or more of the lamps become inoperative.

In the above-described embodiment, where the junction panel terminals, orifice plate apertures and associated lamps are arranged in columns and rows and a voltage is simultaneously applied to all the lamps in a column and a row, it is also possible to connect the lamps in such a way that a higher voltage will be applied to that one which marks the cross point than to the others of the column and row.

In particular, this type of lamp connection may be realized by arranging two groups of wires on the light board so that the wires of one group run perpendicular to the wires of the other and a lamp is connected at every point where the wires of the two groups cross. Every wire of each group is then connected through a separate on-off switch to a common voltage; the voltage for one group of wires being of equal and opposite potential to the voltage for the other. Finally, every wire in each of the two groups is connected to ground (or some other common potential) by means of a separate resistor. Thus, when the appropriate voltage is applied to one wire in each of the two groups by closing the associated switch contacts, the lamp which is connected to both of these wires will receive more than twice the voltage than the lamps connected to only one.

According to a still further embodiment of the present invention, the optical markings may be produced with the aid of a single light source, arranged behind the orifice plate which is capable of shining light through each of the orifice plate apertures. Means are then provided for covering each of the apertures in the plate and selectively opening those apertures which are associated with the terminals to be marked.

In the case where the terminals of the junction panel and, thus, the apertures are arranged in columns and rows, the device for selectively opening the apertures may include two groups of orifice strips, one group arranged in rows on one side of the plate and the other in columns on the other side of the plate. Each of the orifice strips is provided with a number of linearly arranged apertures. The apertures in the strips of the first group are spaced the same distance apart as the apertures in a row of the orifice plate while the apertures in the strips of the second group are spaced the same distance apart as the apertures in a column of the plate. Finally, means are provided which normally hold the strips in a position covering the apertures of the plate but selectively move one of the strips in each of the groups to expose the plate apertures in a particular row and column. This arrangement thus allows light to pass from the single light source through the one aperture of the plate which lies in both the selected row and the selected column. By proper choice of this aperture, the resulting light beam can optically mark the desired junction panel terminal.

In order to move selected ones of the orifice strips, an electrically actuated device, which may include an electromagnet, for example, may be connected to each of the strips.

As has been described above, the means to produce the optical marking may be operated to mark in succession the terminals of the junction panel which are to be connected. It may be advantageous, in this regard, to control the optical marking device to produce the next mark as soon as one connection has been made. It is also possible, however, to optically mark two or more terminals simultaneously, or to simulate the simultaneous marking of two or more terminals by marking these terminals in quick succession. This latter technique may be effected with the aid of a rocker switch.

In the embodiment which employs the single light source and the plurality of orifice strips, the marking of two or more points is achieved by simultaneously aligning the apertures of three or more strips with the apertures of the orifice plate. This embodiment has the advantage that it does not require a large number of lamps which can fail at different times.

According to another preferred embodiment of the present invention, the means for optically marking the terminals of the junction panel includes a single localized source of light and a drive mechanism, connected to the source, for moving it to prescribed positions. The source of light is preferably an electric lamp.

The drive mechanism may advantageously be divided into two parts, each of which moves the lamp in one of two perpendicular coordinate directions.

Preferably, either one or two motors are used to move the electric lamp. According to a further feature of the present invention, the motor or motors are in continuous rotation to move the lamp in the shortest possible time. In this case, the part of the drive mechanism for each coordinate direction is provided with a gear train, each driven by one motor or both driven by a common motor. Each gear train has two wheels or gears arranged to continuously rotate in opposite directions about a shaft. A clutch is provided between each wheel and the shaft so that the shaft may be selectively rotated in one of the two directions by one of the wheels. The shaft, in turn, is connected to move the lamp in one linear direction when it rotates in one direction, and to move the lamp in the opposite linear direction when it rotates in the opposite direction. The shaft is thus selectively connected to the motor by means of a corresponding coupling so that it will rotate in the proper direction without requiring the motor to start and stop.

In general, the apparatus for producing and reflecting the optical markings should be so arranged that the image of the markings will appear to lie in the plane of the view or image of the junction panel. On the other hand, it is also possible to construct the apparatus so that the image of the markings will appear to lie somewhat above the marked terminals.

After each electrical connection has been made, the optical marking indicating the connection may be changed manually. When a plurality of lamps are employed, as in the first embodiment described above, the lamps may be connected and disconnected by manually rotating a mechanical program switch to its next position. This program switch can be wired in the manner necesary to connect the next lamp, or lamp row and column, to a source of voltage. If the voltage is to be applied to only one lamp at a time, the number of switch positions will be correspondingly greater than if two or more terminals are optically marked at once.

This type of multiple-position program switch can also be used to control the electrically actuated devices (e.g. electromagnets) which move the orifice strips. Finally, this program switch can also determine the individual positions to which the drive mechanism moves the lamp in the single localized light source optical marking device described above. This may be accomplished, for example, by constructing the program switch to connect various values of resistors into one arm of a Wheatstone bridge to vary the point at which the bridge is in balance.

The bridge may then be connected to the mechanism which moves the lamp so that the position of the lamp will, in turn, be determined by the point at which the bridge is balanced.

When a manually operated program switch of this type is used as a control device for the apparatus according to the present invention, the sequence of the successively marked terminals will be prescribed by the particular wiring of the program switch.

According to a still further embodiment of the present invention, the sequence of the optical markings is determined by a program-controlled switching circuit. In this case, the individual terminals to be marked are designated as instructions on punch cards, paper tape or some other suitable storage device. The switching circuit sequentially reads the instructions, decodes them in the manner known in the art, and controls the optical marking device in the same manner as the program switch described above to mark the desired terminal or terminals on the junction panel.

The optical marking can be changed, in the embodiment just described, by a pulse signal which instructs the switching circuit to read and execute the next program instruction. This pulse signal can be generated, for example, with the aid of a foot switch or the like, by the person occupied with wiring the junction panel after the connections have been made to the terminals which have just been marked. The pulse signal can also be automatically produced at prescribed time intervals without the intervention of the operator.

In the embodiment which produces the optical marking with a single movable source of light, the drive mechanism for moving the light to prescribed positions may be advantageously controlled by providing a Wheatstone bridge for each of the two coordinate directions, as described above. The resistance of one arm of this bridge can be changed to a value determined by the particular instruction of the program (e.g., on paper tape) read by a suitable control device. The resistance of a second arm of the bridge can then be varied to a value which depends upon the particular coordinate position of the light source. Finally, means can be provided to control each coordinate part of the drive mechanism in dependence upon the voltage appearing across the diagonal of the bridge. If this voltage has one polarity, one clutch of one shaft of the drive mechanism will be actuated; if this voltage has the opposite polarity, the other clutch will be actuated. If the bridge is balanced, neither clutch will be actuated and the light source will remain in the associated position until the next paper tape instruction is executed and the point at which the bridge is balanced is changed.

In order to prevent either of the two coordinate parts of the drive mechanism from moving the light source past a desired position (i.e., the point at which the bridge is balanced), each shaft may be provided with a brake which is actuated shortly before the balance point is reached. The brakes may be connected to operate, for example, when a decreasing voltage on the bridge diagonal drops below a particular threshold voltage.

When a Wheatstone bridge is employed as a control device for each part of the drive mechanism, it may be adapted, according to a further feature of the present invention, to optically mark junction panel terminals that are separated by any particular uniform spacing by inserting a variable resistor in the arm of the bridge which has its resistance controlled in dependence on the position of the light source. Such a change in the "scanning scale" may also be effected by inserting a variable resistor in parallel with this particular arm of the bridge. In order to bring the image of the optical markings into superposition with the view or image of the terminals of the junction panel once the scanning scale has been adjusted, the remaining two arms of the bridge—that is, the arms having resistors which are varied neither in response to the position of the lamp nor by the paper tape control device—are also provided with variable resistors. It is thus possible to shift the position of the optical markings in a single operation before beginning to wire a series of identical junction panels.

It has proven advantageous, in practice, to drive the movable lamp, which serves as the optical marking light source, with electrical pulses. The image of the resulting flashing light is easier for the eye to recognize.

If two or more junction panels are to be wired together and the embodiment of the present invention is used which employs the moving light source, these junction panels may be arranged next to or one behind the other and a plurality of lamps, equal in number to the number of junction panels, mechanically connected together and positioned by the same drive mechanism. In this case, it is preferable if the paper tape, punch card, etc. contain an additional instruction which controls the turning on and off of the individual lamps. Thus, although a number of junction panels having identical construction are wired at the same time, the apparatus according to the present invention will provide a unique marking for one of the terminals on one of the junction panels.

When wiring a number of junction panels, which, for example, can be located in a common case or cabinet, the method and apparatus according to the present invention may also be employed to sequentially mark each junction panel in turn by displacing the cabinet with respect to the field that is optically marked. If the junction panels are also to be connected together, it is useful to employ two sets of the optical marking apparatus according to the present invention. A first optical marking system is used to mark the terminals on a first junction panel while the second system sequentially traverses the other panels to indicate those terminals that are to be connected with the marked terminals of the first panel. By repeating this technique, with the first optical marking system scanning successive junction panels while the other system scans the remaining junction panels, it is possible to mark every individual connection in the entire cabinet.

In order to further reduce the chance of error when making connections in a junction panel, it is suggested, according to a further feature of the present invention, that the apparatus for optically marking the individual terminals be prevented from moving to the next mark until a check has been carried out to ensure that the previous connection has been made correctly. To realize this feature, it is necessary that the rear side of the terminals of the junction panel be exposed and free from other connections—at least at the time that the connections on the front sides of the terminals are to be made. According to this feature, then, the rear sides of the terminals which are to be connected are electrically connected with a testing device. When the proper connection is made to a terminal, the connection closes a circuit allowing current to flow from the testing device. This current can then automatically initiate the advance of the optical marking apparatus to mark the next programmed terminal.

As may be seen, this technique has the advantage of permitting each terminal to be optically marked only when the correct connection has been made to the previous terminal. It is possible also to condition the advancement of the optical marking apparatus upon the presence of a particular value of current. This test not only proves that the connection has been made to the proper terminal, but also that it is of proper quality. Finally, it is additionally possible to condition the advance of the optical marking apparatus upon a sufficient resistance between the terminal connection and ground.

In the testing method just described it is necessary to simultaneously control the current between two terminals. The apparatus for carrying out this method must therefore be constructed to process the data for two subsequently marked terminals. This requires a large number of electronic storage and control devices.

To deduce the expense of these electronic devices, the present invention proposes to test the passage of current through each connection between a wire and a terminal of a junction panel. This proposal is effected, in a preferred embodiment, by connecting in a test circuit the rear of the terminal to which a connection has been made, preferably with the aid of the paper tape operated control device, and placing a test probe, which is likewise electrically connected in the test circuit, against the wire which has just been connected. Only when the test circuit senses the passage of current through the test probe, the connecting wire and the terminal, will the optical marking apparatus be advanced to mark the next terminal.

According to another preferred embodiment of the apparatus for realizing this particular testing feature, the various connecting wires which will be successively required to wire the junction panel are temporarily connected in series and wound on a drum to form a garland. If the free end of the garland is connected to the test circuit, it is no longer necessary to use the test probe. After a connection has been made to a terminal and the rear side of the terminal has also been connected to the test circuit, the connection may be tested by passing current through the garland, the connecting wire and the terminal. The apparatus for optically marking the various terminals will then only be advanced to mark the next terminal if the resistance of this current path is sufficiently low.

In order, on one hand, to avoid the necessity of using a test probe or forming a garland in the manner described above and, on the other, to avoid the necessity of the storage and control devices associated with the simultaneous testing of two terminals, the correctness and quality of the individual terminal connections may also be tested according to the following technique.

Before beginning to make any connections on the front side of a junction panel, the rear side of each of the terminals is connected to one side of a capacitor. In the course of making a connection between two or more terminals of a junction panel and the wire, a charge is placed on the associated capacitor of at least one terminal, and, eventually, on the capacitors of the other terminals, by means of the wire just connected to that terminal. Afterwards a check will be made. If the capacitor of the terminals which must be connected to that wire possesses a charge, and only if that is so, the optical marking device is advanced to the next instruction in the program. According to one embodiment of this testing method, a charge is placed on the associated capacitor while the first terminal to be connected is optically marked. After the panel connection has been made with the further terminals which are to be connected to this terminal, the outputs of these further terminals are checked for the presence of the charge. For example, if the charge on the capacitor of the first terminal produces a current at the output of the second terminal, etc., the optical marking device is advanced to the next instruction in the program.

According to another embodiment of the abovementioned test method, there is supplied a charge at the terminal which is marked at a second place. If a correct connection is made between the terminals marked at the first place and at the second place, besides the capacitor associated with the terminal marked at the second place, automatically also the capacitor related to the terminal marked at first is charged. If the testing apparatus finds a charge on the capacitor of the terminal marked at first, it causes the optical marking device to advance. The same is done at the third and the following terminals, which are to be connected to one wire; always at the capacitor of the terminal marked at first, the check for the presence of the charge is made. In this testing method always two terminals have to be controlled, but not at the same time, however, but one after the other; therefore, it is possible to use the same control-switch for controlling both terminals. Additionally, it is only necessary to provide storage means or reading-in means for the control order of the terminal marked at first, which is repeatedly controlled for checking purposes. In this case, after each check a discharge of the capacitors must be done.

With this type of testing apparatus, no test is conducted—and, thus, no signal is produced to advance the optical marking apparatus—when the wire, which is to connect two or more terminals of the junction panel, is connected to the first terminal. In this case, the order to advance the optical marking apparatus must be generated by the operator, for example, by means of a foot switch. After the next subsequent connection is made, however, the output of this second terminal or the terminal marked at first is tested for the presence of a charge. If the charge appears, and it is clear that the correct connection has been made, the optical marking apparatus will be automatically advanced to mark the next terminal. If still further connections are to be made with the same connecting wire, the test for a charge is carried out after each such connection. According to a particular feature of the first mentioned embodiment of this testing method when more than two terminals are to be connected by one wire, a charge is repeatedly placed on all the capacitors which happen to be connected to the terminals that are already connected to the wire. In each successive test for the correctness of the connection, the presence of the combined charge—not simply the charge on the capacitor associated with the last-connected terminal—is checked.

The testing method and apparatus described above has the advantage that it may be employed to double-check a junction panel after all the connections have been made. The other testing techniques, which employ the test probe or form the garland of the supply of connecting wires, cannot be used to double-check the junction panel connections.

The connections are double-checked in the same manner in which they were checked. A charge is placed on a capacitor associated with a particular terminal connection and the terminals which should have been connected to that terminal checked for the presence of the charge. If necessary, the capacitor or capacitors can be recharged to check successive terminals.

It is preferable, both during the initial and the double-check, to completely remove the charge from the capacitor or capacitors after testing the last terminal in a series of connections. This is particularly important when a number of identical junction panels are to be or have been connected together and the connections in these panels are optically marked by the same machine with corresponding terminal connections being controlled in parallel. If the capacitors are not properly discharged, it would be possible to detect a charge—thus indicating a proper connection—after making an incorrect connection on one junction panel from the presence of this charge on the corresponding correctly wired terminal in another junction panel.

The capacitors which have been connected to the various terminals of a junction panel in accordance with this embodiment of the invention may also be used to effect other checks. Before a connection between a terminal and a connecting wire is made, for example, it is possible to check to insure that the capacitance associated with the particular terminal equals the known value of the attached capacitor. If this is not the case, there is something wrong with the terminal. It is also possible to measure the capacity after having made the connection between a wire and a terminal of the junction panel. In this case a positive result of measurement for the first terminal of a wire is then obtained, when the measured capacity is equal to the capacity of the capacitor associated to that terminal. On the contrary, a double or other multiple of this capacity is obtained during the checking at the other terminals, which are connected to this wire. This technique may also be used, when double-checking the junction panel, to ensure that the terminals which should not have been wired are, in fact, free of connections.

In addition, the capacitors connected to the various terminals may be used to ensure that the unconnected, or not yet connected, terminals are not short-circuited to ground. In this case, the side of the capacitor which is not connected to the terminal of the junction panel is connected to ground. A measurement is then made of the capacitance between the junction panel terminal and ground to ensure that it is the same as the value of the capacitor.

After the terminals of the junction panel have been wired, a double-check may be made of the capacitance between the connected terminals and ground. In this case, the measured capacitance should be equal to the sum of the values of the capacitors which are interconnected by a terminal connecting wire. If the measured value turns out to be zero, one of the terminals is short-circuited to ground. If the measured value turns out to be less than the sum of the values of the interconnected capacitors, one or more of the terminals is not properly connected to the connecting wire.

The method and apparatus according to the present invention may not only be used to assist in making connections between the terminals of a single junction panel; it may also be used to make connections between two junction panels which lie some distance from each other. In this case, it is necessary to use one such apparatus to optically mark the terminals of each junction panel. If, for example, two junction panels are to be connected together, one of the terminals on each panel to be interconnected is then optically marked, either simultaneously or in succession, by each apparatus.

In the discussion of the optical marking apparatus above, it was assumed that the terminals of a particular junction panel all lay in the same plane. This is not obsolutely necessary for the proper operation of the apparatus. With a somewhat modified construction of the orifice plate it is possible to mark terminals which lie in separate planes so long as the terminals do not overlap. In this case, the orifice plate should take the shape of the mirror image of the particular nonplanar junction panel.

DESCRIPTION OF THE PREFERRED EMBODIMENTS

Figure 1A:
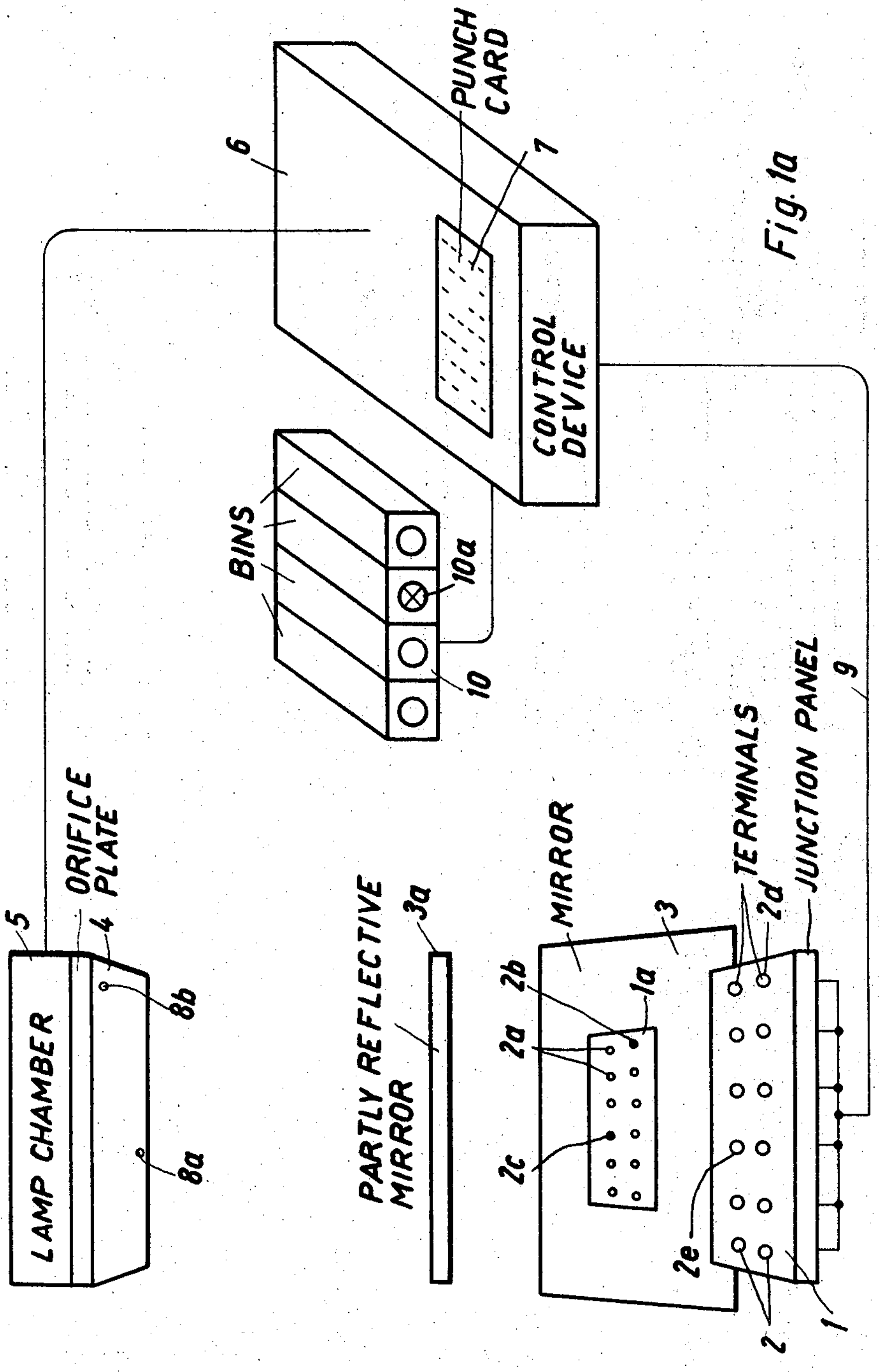
FIG. 1*a* is a perspective view of apparatus, according to a first preferred embodiment of the present invention, for assisting in the wiring of individual terminals of a junction panel.
Figure 1B:
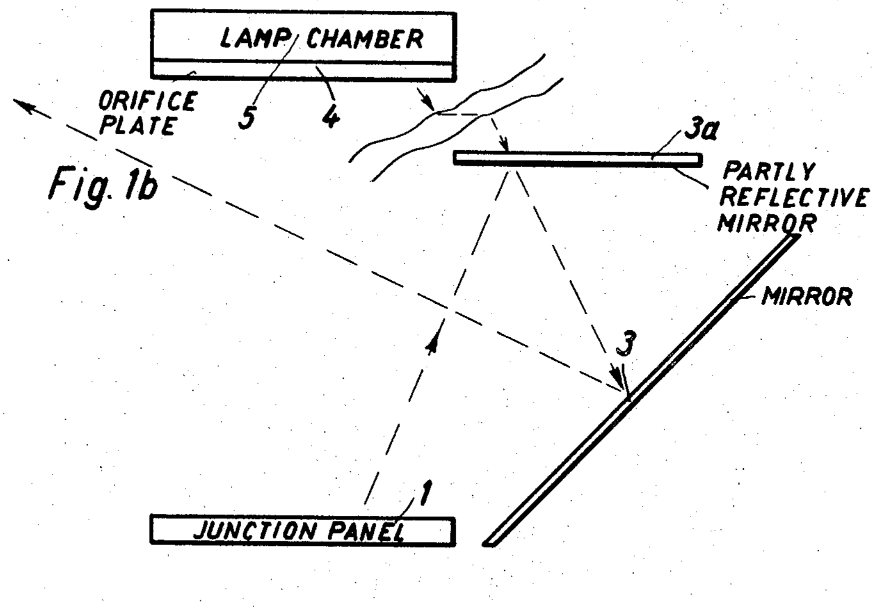
FIG. 1*b* is a representational diagram, in cross-sectional view, of a part of the apparatus of FIG. 1*a*.

Referring now to the drawings, FIGS. 1*a* and 1*b* illustrate one embodiment of the apparatus, according to the present invention, for assisting in the production of electrical connections between individual terminals of a junction panel. In this embodiment, the image of the junction panel is superimposed upon the images of the optical markings in a plane mirror. In particular, FIG. 1 shows a junction panel 1 having a plurality of terminals 2 which, for example, may be constructed as plug sockets. In practice, the junction panel 1 will, of course, be provided with considerably more plug sockets than are shown in the figure; for the same of clarity, the junction panel is illustrated here with only twelve terminals. This junction panel might, for example, consist of two plug boards with six sockets each, of the type commonly used today in computer hardware.

Behind the panel 1, is located a substantially wholly reflective mirror 3. The surface of this mirror may be arranged, for example, to form a 45° angle with the plane of the panel. The image *1a* and *2a* of the panel 1 and the sockets 2, respectively, is formed in the mirror 3 with the aid of a partly reflective mirror *3a*.

Directly above the panel 1 is arranged an orifice plate 4 and a light chamber 5 which together selectively generate the optical markings. The plate 4 is provided with twelve apertures, not shown, each located immediately beneath a small electric light or lamp mounted in the light chamber 5. The junction panel 1, the mirror 3, the partly reflective mirror *3a*, as well as the orifice plate 4, are arranged in such a way that the plane of the image of the optical markings generated by the small lamps and the orifice plate 4 will coincide with the plane of the image of the junction panel 1 in the mirror 3.

The illustration of the entire apparatus in FIG. 1*a* is drawn, as if the eyes of the observer were at the level of the partly reflective mirror *3a*. For this reason the junction panel 1 is shown as it would be observed at an angle from above, while the orifice plate 4 is shown as viewed at an angle from below.

The arrangement of the junction panel 1, the mirror 3, the partly reflective mirror *3a*, and the orifice plate 4, is shown again in side view in FIG. 1*b*. As may be seen in this figure, the partly reflective mirror *3a* will form an image of the junction panel 1 that, because of its angle of incidence, will lie in the plane of the orifice plate 4. Since the light from the plate 4 will pass through the partly reflective mirror *3a*, both it and the image of the junction panel 1 will be reflected in the mirror 3 and thus be visible to a person observing the mirror 3. As may be seen in FIG. 1*a*, the image of the apertures in the orifice plate 4 will be superimposed on the image *2a* of the plug sockets of the junction panel 1.

The individual lamps within the light chamber 5, may be switched on and off by the control device 6. This control device 6 is constructed in the manner known in the art to receive and read a punch card 7, that stores the necessary information concerning the connections to be produced.

In the instance illustrated in FIG. 1, the control device 6 is operative, as the result of certain holes in the punch card 7, to apply a voltage to, and thus illuminate, the small lamp in the front column in the third row from the left and the lamp in the rear column in the right-hand row (apertures *8a* and *8b*, respectively in the orifice plate 4). Because of the physical arrangement of the junction panel in relation to the orifice plate 4, as well as the arrangement of the partly reflective mirror *3a* and the mirror 3, the images *2b* and *2c* of the plug sockets *2d* and *2e* are optically marked by points of light (i.e. the dark spots shown in FIG. 1*a*). These illuminated spots effectively designate, to the person occupied with making the connections within the junction panel 1, the terminals of the junction panel that are to be connected with each other.

The apparatus of FIG. 1 is also provided with a plurality (e.g., four) bins or pigeon holes 10 each of which contain connecting wires of a different length. The control device 6 is also operative to illuminate a lamp *10a* to optically mark the bin which contains the supply of wires of proper length for a particular connection (e.g., the connection between the terminals *2d* and *2e*). The instruction to optically mark one of the four bins 10 is likewise contained on the punch card 7 and converted, by the control device 6, into a voltage which illuminates one of the bin-marking lamps.

The control devices 6 is also connected by a cable 9 to the rear side of the plug sockets 2 of the junction panel 1. Each wire of the cable 9 is connected to an individual one of the plug sockets. Therefore, when the required connection between the points *2d* and *2e* is effected, the resulting closed circuit can initiate the next operation of the control device 6 to optically mark the next two terminals to be connected. The control device 6 then scans the next instruction on the punch card 7 and applies the necessary voltages to the light chamber 5 and the wire bins 10, so that two or more different lamps in the chamber 5, and, if necessary, a different lamp in the bin 10, will be illuminated. The punch card 7 thus contains all the instructions necessary for producing the connections on the junction panel 1.

As has been mentioned above, it is also possible to control the quality of the connections within the junction panel 1. In this case, the control device 6 is operative to scan the next instruction only if a correspondingly large amount of current flows through the connecting wire between the terminals *2d* and *2e*. The amount of current is here a measure of the quality of the connection. In addition, as has likewise been mentioned above, the control device 6 may also carry out a test to insure that the connection is isolated from the ground.

Figure 2:
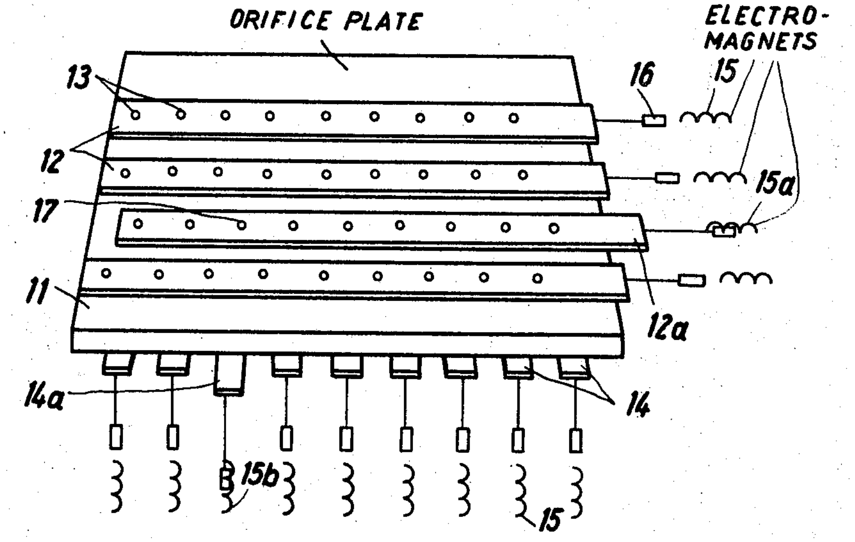
FIG. 2 is a representional diagram, in perspective view, of a particular preferred embodiment of the device, in the apparatus of FIG. 1, for producing optical markings.

FIG. 2 shows an embodiment of a device which may be used in place of the light chamber 5 of FIG. 1 to produce the optical markings. The device includes a plate 11 which serves as an aperture plate; this plate is provided with as many apertures (not shown) as there are terminals in the junction panel—i.e., one for each terminal to which a connection is to be made. The apertures are arranged in rows and columns in a manner which corresponds to the distribution and arrangement of the terminals to be marked.

The entire plate 11 is arranged in the apparatus of FIG. 1 directly facing the junction panel 1; that is, in place of the light chamber 5.

A light source (not shown) is provided to illuminate the entire side of the plate 11 which faces away from the junction panel. A plurality of orifice strips 12, which are likewise provided with apertures 13, are arranged in columns on the illuminated side of the plate 11. The spacing of the linearly arranged apertures 13 in the strips 12 corresponds to the spacing in the associated columns of apertures in the plate 11. When the strips are in their normal position, however, the apertures 13 are not in alignment with the corresponding apertures in the plate 11; rather, each strip 12 is positioned to cover all the apertures in a column of the plate.

Below the plate 11 is a second set of strips 14 which are likewise provided with apertures distributed in a manner which matches the spacing of the apertures in the rows of plate 11. The strips 14 are arranged perpendicular to the strips 12 and, like the strips 12, are situated, when in their normal position, to cover the apertures in the plate 11.

Each strip 12 and each strip 14 is provided with an electromagnet 15, as shown schematically in FIG. 2. When such a magnet 15 is excited by passing an appropriate current therethrough, it will move an associated soft iron member 16. Since each of the members 16 is attached to a corresponding strip 12 and 14, each electromagnet is operative to displace an associated strip so that the apertures in the strip will be aligned with the corresponding apertures in the plate 11. When the current applied to a particular magnet 15 is switched off, the associated strip 12 and 14 is returned to its normal position, for example, by means of the force of a spring.

To mark one of the terminals on the junction panel which is to be connected, it is necessary to actuate two electromagnets: one magnet associated with a row strip and the other with a column strip. As in the case of the light chamber 5 in FIG. 1*a*, this can be accomplished with instructions taken, for example, from a punch card or from paper tape, which instructions are converted by a suitable control device into electric currents applied to the two electromagnets 15 (control device 6 in FIG. 1*a*).

In the embodiment shown in FIG. 2, it is assumed that electric current has been supplied to the electromagnets *15a* and *15b* to shift the strips *12a* and *14a*, respectively. Since, in this case, the apertures in the strip *12a* are aligned with the apertures in the corresponding column of the plate 11, and the apertures of the strip *14a* are aligned with the apertures in the corresponding row of the plate 11, the light from the light source will be permitted to pass entirely through the aperture 17.

If the device of FIG. 2, together with the light source, is employed in place of the elements 4 and 5 of FIG. 1*a*, the resulting controllable beams of light may be used to optically mark the terminals of the junction panel 1.

Figure 3:
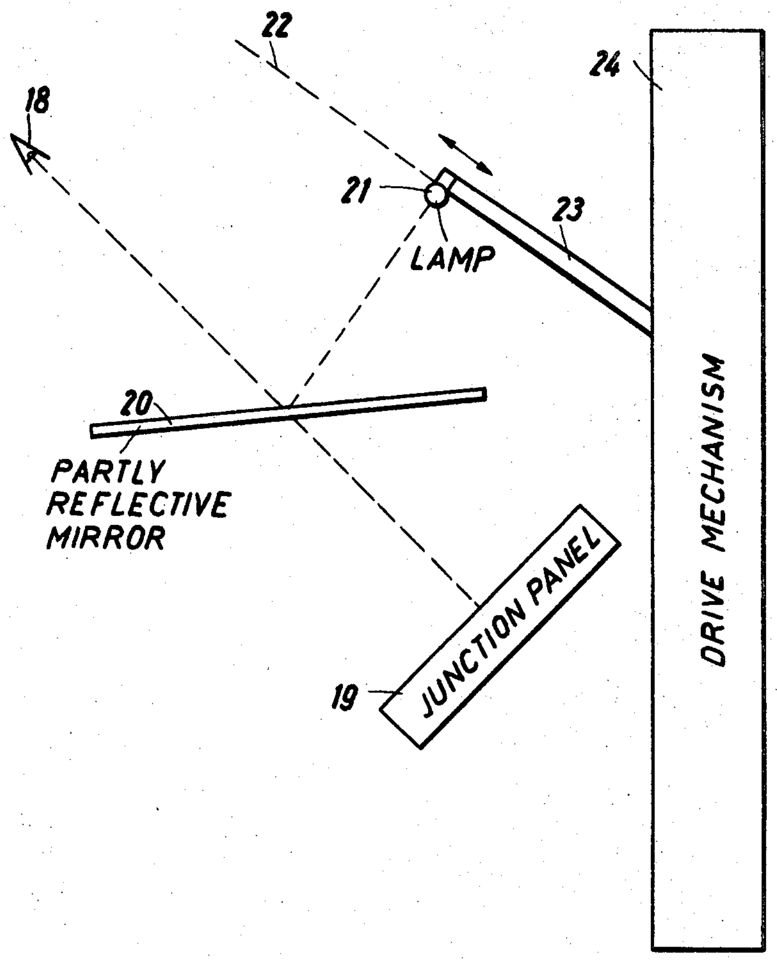
FIG. 3 is a representational diagram, in cross-sectional view, of a portion of apparatus, according to a second preferred embodiment of the present invention, for assisting in the wiring of a junction panel.
Figure 4:
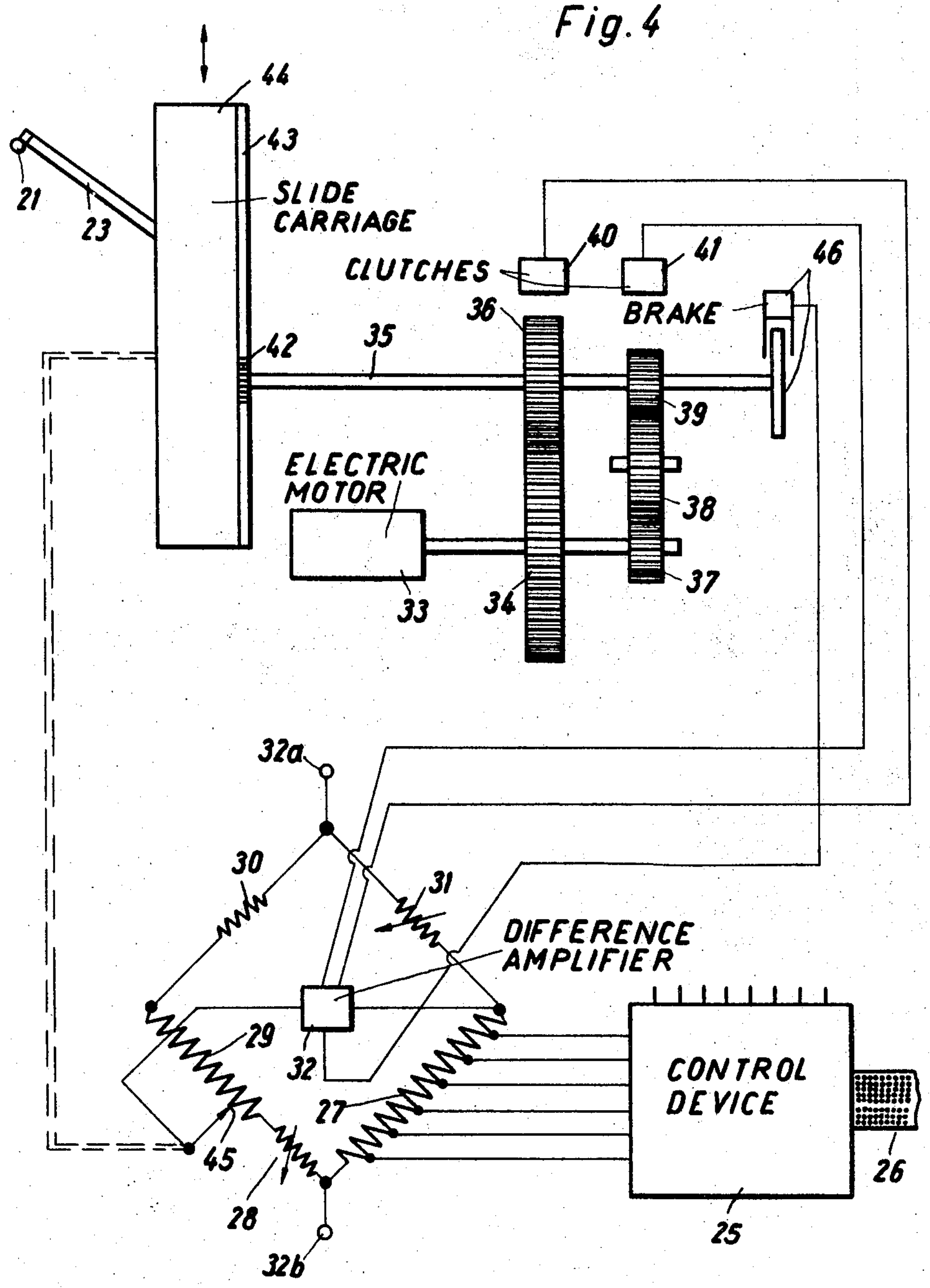
FIG. 4 is a schematic and representational diagram of a particular preferred embodiment of a device for controlling light source movements in the apparatus of FIG. 3.
Figures 5, 6:
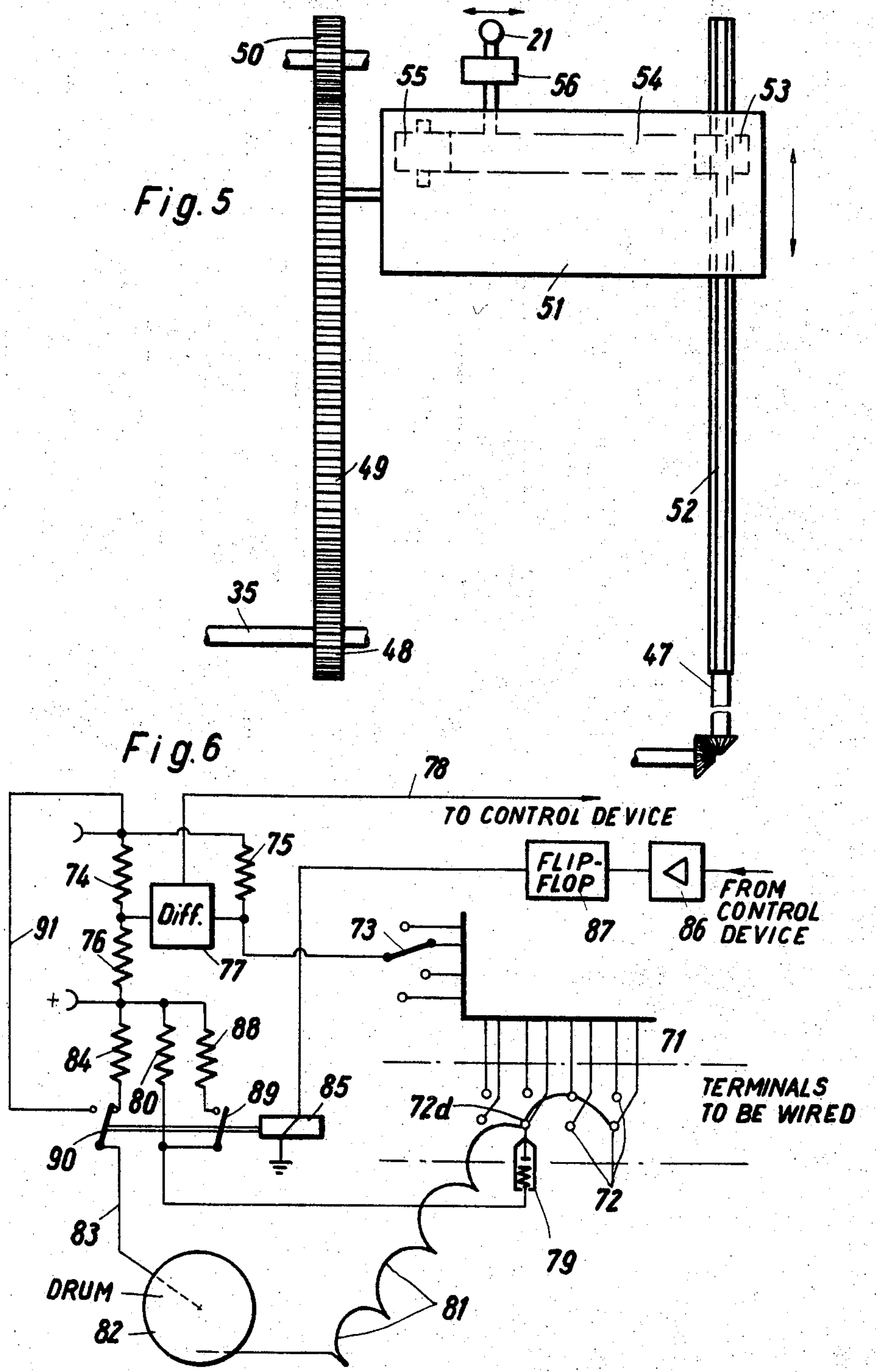
FIG. 5 is a representational diagram of a portion of a modified embodiment of the device of FIG. 3.
FIG. 6 is a schematic diagram of one embodiment of apparatus, which may be used in conjunction with either the apparatus of FIG. 1, or the apparatus of FIG. 3, for testing the electrical connections on a junction panel.

FIGS. 3, 4, and 5 illustrate a second embodiment of the apparatus of the present invention for assisting in the production of electrical connections between the individual terminals of a junction panel. In this embodiment, the optical markings are produced by a single light source or lamp which may be moved to selected positions.

FIG. 3 of the drawings is a representational diagram, in side view, of the general arrangement of the portion of this apparatus which forms the operator's work table. As may be seen, the junction panel 19, which is to be wired, is viewed by the eye of the operator through a partly reflective mirror 20. A point of light, which is generated by a lamp 21, is reflected by the mirror 20 so that its image is superimposed on the point on the junction panel 19 that is to be marked. The lamp 21 is mounted on a supporting arm 23 that may be moved by a drive mechanism contained in the cabinet 24. This drive mechanism is constructed to move the lamp to selected positions in the plane perpendicular to the plane of the illustration formed by the straight line 22.

The apparatus for moving the lamp 21 in one of two coordinate directions will now be described in connection with FIG. 4. This figure shows a control device 25 which reads instructions stored on a paper tape 26 and, in response to these instructions, changes the value of resistance of a resistor 27, which is formed by a helix of resistive wire. The control device in 25 also simultaneously changes the value of a second identical resistor, not shown, to control the position of the lamp 21 in the other coordinate direction.

As noted just above, FIG. 4 provides an illustration of the apparatus necessary to move the lamp 21 in only one coordinate direction. It should be understood that, with the exception of the control device 25, and the paper tape 26, another complete set of identical elements must be provided to control the position of the lamp 21 in the other coordinate direction.

The resistor 27 forms one arm of a Wheatstone bridge; the other arms of the bridge are formed by the resistor 28 and a part of the resistor 29, the resistor 30 and the other part of the resistor 29, and the resistor 31. The bridge voltage is applied at the terminals 32*a* and 32*b*. A difference amplifier 32 is connected across the other bridge diagonal to control the movement of the lamp 21 in the one coordinate.

A continuously rotating motor 33 is provided to supply the force necessary to move the lamp 21. This motor is connected to rotate gears 36 and 39 in opposite directions on a shaft 35. The gear 36 is driven with the aid of a gear 34, while the gear 39 is driven with a gear 37 and a speed reversing gear 38. The various gears are preferably chosen so that both the gears 36 and 39 will be driven, though in opposite direction, with the identical rotational speed.

Each of the gears 36 and 39 can be selectively coupled to the shaft 35 with a magnetic clutch. For the sake of clarity, these clutches are illustrated in FIG. 4 by elements 40 and 41, above the gears 36 and 39, respectively.

The clutches 40 and 41 are electrically connected with the difference amplifier 32 so that one clutch will be actuated upon occurrence of a voltage of one polarity while the other will be actuated with a voltage of the opposite polarity. When the clutch 40 is actuated it connects the gear 36 to rotate the shaft 35 in one direction; when the clutch 41 is actuated, it connects the gear 39 to rotate the shaft 35 in the opposite direction.

The shaft 35 is connected to rotate a gear 42 which moves a gear rack 43 and a sliding carriage 44 in the direction indicated by the arrows. Since the lamp 21 is fastened to this carriage by means of the supporting arm 23, it, too, will move in the direction of the one coordinate designated by the arrows.

As the carriage 44 is moved, it also moves a slide 45 on the helically wound resistor 29. Thus, the carriage will continue to move until the Wheatstone bridge is balanced; that is, when the ratio of the effective part of the resistor 27 (i.e., the sum of the portions thereof that are not short-circuited by the control device 25 in response to the paper tape instructions) to the value of the resistor 31 is identical to the ratio of the value of the resistor 28 and the associated part of the resistor 29 to the value of the resistor 30 and the other part of the resistor 29.

In order to insure that the slide 45 will not move past the balance point on the resistor 29, it is also possible to provide a brake 46, such as a magnetic brake, which is actuated when the difference voltage sensed by the difference amplifier 32 falls below a prescribed threshold; that is, when the bridge approaches the balancing point.

As has been pointed out above, the apparatus illustrated in FIG. 4 functions only to move the lamp 21 in the direction of one coordinate. In order to move the lamp in the other orthogonal coordinate in the embodiment of the invention illustrated in FIG. 3, it is necessary to provide another carirage movable in the other coordinate direction. This second carriage should be constructed to support the elements 21, 23, and 33 to 46.

It should be understood, in this connection, that both the additional carriage and the carriage 44 may also be driven by other means besides the gear 42 and the gear rack 43.

According to a modification of the embodiment of the present invention illustrated in FIGS. 3 and 4, it is possible to employ the motor 33 to move the lamp 21 in the direction of both coordinates so that only a single motor will be necessary. In this case, the gears 34 and 37 of FIG. 4 also drive two additional gears which correspond to the gears 36 and 39 and which are rotatably mounted on a second shaft, similar and parallel to the shaft 35. The rotational movement of this second shaft is transferred by means of two bevel gears to still a third shaft arranged at an angle of 90° to the shaft 35. This third shaft is shown as shaft 47 in FIG. 5.

FIG. 5 illustrates apparatus according to the present invention for controlling the position of the lamp 21 by the angular position of two shafts 35 and 47 arranged at an angle of 90° with respect to each other. The shaft 35, in this case, is connected to a gear 48 which drives a gear belt 49 suspended between the gears 48 and 50. A carriage 51, arranged to slide in a direction parallel to the axis of the shaft 47, is connected to, and thus driven by, the belt 49.

The lamp 21 is similarly arranged to move in the direction parallel to the axis of the shaft 35 in response to rotation of the shaft 47. The shaft 47 is connected to rotate a six-sided shaft 52 and, in turn, a gear 53. The gear 53 is mounted to slide along the shaft 52 upon movement of the carriage 51. As the gear 53 is rotated by the shaft 52 it drives a gear belt 54 which is tensioned between the gears 53 and 55. Finally, a second carriage 56 supporting the lamp 21 is connected to the gear belt 54.

Whereas, in the illustration of FIG. 5, the gear belt 49 moves the carriage 51 in the up and down direction, the gear belt 54 moves the carriage 56 to the right or to the left. By rotation of the shafts 35 and 47, therefore, the lamp 21 can be moved to any desired position within a limited area which is determined, on one hand, by the distance between the gears 48 and 50, and, on the other, by a distance between the gears 53 and 55.

To adjust the machine to move the lamp 21 to mark junction panels, the terminals of which have different spacing, it is only necessary to vary the value of the resistor 28 of FIG. 4. This resistor adjusts the "scanning scale" of the machine to match the terminal spacing of any junction panel 19. Parallel displacements of successively generated images can be effected by changing the value of the resistor 31. Variable resistors are also provided on the second Wheatstone bridge which controls the other coordinate so that different types of junction panels can be scanned by simply adjusting four resistors.

As has been mentioned above, it is possible to test the correctness of the various connections made on the junction panel by inserting every connection between a terminal and a connecting wire in a test circuit. Apparatus for carrying out this test will now be described in connection with FIG. 6.

FIG. 6 shows a junction panel 71 having a plurality of terminals 72 formed as plug sockets. These plug sockets 72 can be selectively connected into a bridge circuit by a switch 73 which is adjusted either manually or by a control device. The bridge consists of the resistors 74, 75 and 76 as well as a resistor combination 80 and 84 or 80 and 88. While the resistors 74 to 76 are of value R, the resistors 80, 84 and 88 are each of value 2R. A difference element 77 is provided to determine when the bridge is balanced. When the bridge has been balanced, the element 77 issues a control signal on the wire 78 to switch the control device (not shown) to the next point (instruction) in the program.

In the embodiment of FIG. 6, the test probe 79 is just used to insure that the proper connection was made to the marked terminal 72*d*. At this point, the connecting wire which has just been attached to the terminal 72*d* is still electrically connected with a supply of connecting wires 81 which are attached end-to-end by temporary connections and connected in a garland to the conductor 83. When the switch contact 90 is in the position shown, the wire just connected to the terminal 72*d* is, therefore, also connected to the resistor 84, while the terminal itself is connected, via the probe 79, to the resistor 80. If the selector switch 73 is in the proper position, and if, and only if, a proper connection has been made at the proper terminal 72*d*, the resistors 80 and 84 will form a parallel circuit having the resistance R as one arm of the Wheatstone bridge. Only then will the bridge be balanced and a signal produced on the line 78 to switch the control device to the next point in the program.

In the embodiment illustrated in FIG. 6, both the test probe 79 and the wires 81 are included in the test circuit. If the resistor 80 is given the value R, the test probe 79 can be used alone to test the connection of the terminal 72*d*. When the test probe 79 is placed against the connection between the connecting wire and the marked terminal, and the selector 73 is switched to connect the rear side of the terminal to the resistance bridge, the bridge will again be balanced, and the control device switched to the next instruction in the program, if the proper connection has been produced.

Finally, it is possible also to test the connection without using the test probe 79. In this case, the supply of connecting wires 81, which are connected in series, and, for example, wound on the drum 82, should be connected via the line 83 and the contact 90 to the resistor 84 to the bridge. The resistor 84 should be chosen, here, to have the value R so that the resistance of the arm of the bridge formed by the selector switch 73, the terminal 72*d*, the series-connected supply of connecting wires 81 and the resistor 84 will balance the bridge when the end of the wires 81 has been connected to the right terminal. As before, when the bridge is balanced a signal on the line 78 will switch the control device to the next point in the program.

It is also possible to construct the bridge so that the control device will be switched to the next point on the program only after a connecting wire has been connected to a terminal and the temporary connection between the just-connected wire and the next following connecting wire 81 has been severed. In this case, however, the bridge must itself be modified by the control device.

In the embodiment shown in FIG. 6, the modification of the bridge is effected by a relay 85 which is switched by a signal from the control device passed through the amplifier 86 and stored in the flip-flop 87 after the last connection has been made with a particular connecting wire.

If it is assumed again here that the test is conducted with the resistors 80 (via the test probe) and 84 (via the wires 81 and the conductor 83) connected in parallel—that is, with the resistors 80 and 84 each having the value 2R—the resistor 88 should also be given the value 2R. When the relay 85 is switched, the contact 89 will connect the resistor 88 in parallel with the resistor 80. In this relay position, the bridge can only be balanced via the test probe when the supply of connecting wires 81 have been separated from the terminal 72*d* (that is, by severing the temporary connection with the wire just connected).

If the supply wires 81 have not been separated, the bridge will be so locked via the contact 90 and the line 91 that it will be impossible to switch to the next instruction on the program. In short, the execution of the next instruction will only be possible when the series-connected supply wires 81 do not pass current.

If necessary, the bridge may be operated without the locking circuit. In this case, the resistor 84 remains connected to the connecting wires 81 (that is, by elimination of the contact 90) and the bridge remains unbalanced until, by severing the supply wires 81 from the terminal 72*d*, the resistor 84 is disconnected from the test circuit. In this instance, however, a temporary voltage should be applied to the difference amplifier 77 during the time that the bridge settles into the unbalanced state determined by the resistors 80, 84 and 88. This is necessary to prevent the temporary occurrence of the difference voltage "0" at the input of the difference amplifier 77 during the change of voltages in the bridge, and thus a signal on the line 78 to move to the next instruction on the program, even though the supply wires 81 have not been severed.

Finally, if it is desired that the bridge be balanced, when testing the individual terminals, with current passing only through the series-connected supply wires 81—that is, without use of the test probe 79—the resistor 84 should be given the value R. And if, in addition, it is desired to test whether the end of a just-connected wire has been severed from the adjacent supply wire, the relay 85 may be employed to provide the resistor 84 with a different value, such as 2R. Then, when the last connection between the connecting wire and a terminal has been made, but the connecting wire has not severed from the supply wires, the bridge will no longer be balanced even when the test probe 79 is placed against the connected terminal (the resistor 80 connected to the test probe should be given the value R; the resistor 88 can be eliminated). The bridge will then only be balanced if the proper connection has been made to both ends of a connecting wire, if the connecting wire has been severed from the supply wires 81, and the test probe 79 has been placed in contact with the terminal 72*d*.

In the last embodiment, therefore, the test probe need only be used at the time when the final end of a connecting wire has been connected. Here, the relay 85 should change the value of the resistor 84 from R to 2R just before this final end is connected to a terminal. As noted in the case above, the difference amplifier should be temporarily blocked while the bridge settles into its unequalized stable state so that the proper signal will appear on line 78 only after the supply wires 81 have been severed from the wire just connected.

It is possible, therefore, with the test procedure described above to determine, with the exception of the last connection, whether connecting wires have been connected to the proper ones of the individual terminals of a junction panel. In the case of the last connection between the end of a connecting wire and an associated terminal, the test procedure makes it possible to insure not only that the connection is proper, but also that the end of the connecting wire has been severed from the serially attached supply of connecting wires. Only then is the control device permitted to progress to the next point in the control program. This test procedure also automatically checks to insure that the connecting wires supplied one after the other have the proper number of terminals.

If the connecting wires are provided, at the point thereof to be connected, with plugs which may be inserted in corresponding plug sockets (terminals) in a junction panel, the test probe 79 may simultaneously serve as a plug-in tool. As illustrated in FIG. 6, the test probe 79 may include a contact which closes the circuit between the tip of the probe and the resistor 80 only when a certain amount of pressure has been applied. The amount of pressure required to close the circuit is chosen to exceed the amount of pressure required to insert a plug of a connecting wire into a plug socket. This arrangement will thus insure that a sufficient plug-in pressure has been applied before the resistor 80 is connected into the test circuit.

A still further technique for checking the correctness of the connections produced on a junction panel will now be described in connection with the apparatus illustrated in FIG. 7. This apparatus is considerably simpler in design and operation than the apparatus of FIG. 6. It does not require the expense of control and storage devices, does not require the use of a test probe, and does not require that the supply of wires be connected in series and to a garland.

Figure 7:
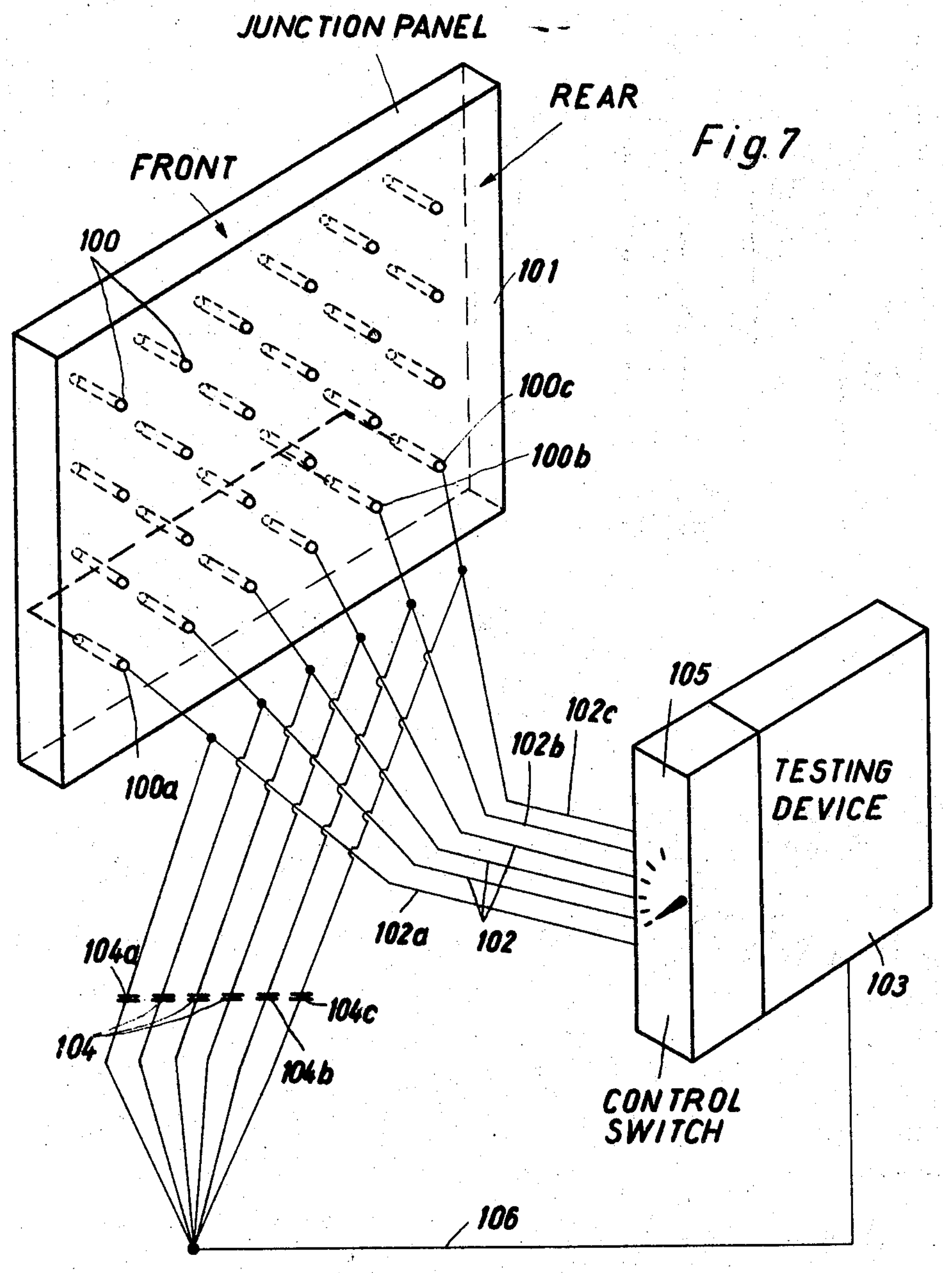
FIG. 7 is a representational diagram, in perspective view, of another embodiment of apparatus, which may be used in conjunction with either the apparatus of FIG. 1 or the apparatus of FIG. 3, for testing the electrical connections on a junction panel.

FIG. 7 shows, in perspective, a junction panel 101 and a testing device 103. It may be assumed, for example, that this junction panel 101 (viewed from the back side) is formed by a plurality of plug socket strips. The connection between the individual sockets 100 is to be made on the front side (not visible) of the junction panel with the aid of the optical marking method and apparatus described above. The junction panel is designed so that one or more plug-in boards, containing printed circuits or the like, may be inserted in the plug sockets from the back side of the panel. In practice, such a junction panel exhibits many more terminals than are shown in the figure.

In order to check to insure that all of the connections made on the junction panel are correct, all of the plug sockets are connected, via wires 102 and a control switch 105, to the testing device 103. For the sake of clarity, however, only the connecting wires 102 which are plugged into the lowest terminal row of the junction panel have been shown in FIG. 7.

Every terminal 100 of the junction panel 101 is also connected to one terminal of a capacitor 104. The other terminal of each capacitor is connected to the testing device 103 through a single wire 106; i.e., all the capacitors are connected in parallel.

Let it be assumed that a connecting wire is to be connected between the terminals 100*a*, 100*b* and 100*c* as shown by the dotted lines. To accomplish this, the terminal 100*a* will first be optically marked on the front side of the junction panel 101. Simultaneously, the paper tape, which instructs the optical marking apparatus to mark the terminal 100*a*, also instructs the control switch 105 to connect the wire 102*c* with the testing device 103. After this connection has been made, the testing device 103, likewise under control of the paper tape, automatically places a charge on the capacitor 104*a*.

After the terminal contact on the connecting wire has been inserted in the terminal 100*a*, the operator, who wires the junction panel, switches the optical marking control device to receive the next instruction in the program. The terminal 100*b* on the front side of the junction panel 101 will then be optically marked and the wire 102*b* will be connected to the testing device 103 by the control switch 105.

The testing device 103 now checks to see if a connection has been made between the terminals 100*a* and 100*b*; that is, whether current flows through the wire 102*b* as a result of a charge on the capacitor 104*a*.

If current does flow through the wire 102*b*, and the proper connection between the terminals 100*a* and 100*b* has been made, a charge is placed on the capacitors 104*a* and 104*b*, the control device of the optical marking apparatus is switched further to mark the next terminal 100*c*, and the wire 102*c* is connected with the testing device 103. At this point, the testing device checks the presence of the charges on the parallel-connected capacitors 104*a* and 104*b* and may initiate a discharge of these capacitors through the wire 102*c* before the control device is switched to the next instruction in the program.

According to the other embodiment of this testing method the charging is done when the terminal 100*b* is marked, and this terminal is connected to the wire shown by the dotted lines. When supplying a charge to the terminal 100*b*, the capacitors 104*a* and 104*b* are charged. Afterwards the capacitor 104*a* whose terminal is marked at first, is automatically connected to the testing device 103. The testing device 103 checks if the capacitor 104*a* associated with the terminal 100*a* is charged. For this purpose the wire 102a is connected with the testing device 103 by means of the control switch 105. When a charge is registered, it is ascertained that the connection made between the terminals 100*a* and 100*b* is correct. After having discharged the capacitors 104*a* and 104*b* the terminal 100*c* is optically marked and is then connected to the wire. Afterwards the capacitor 104*c* is charged by means of the wire 102*c*. Hereby automatically also the capacitors 104*a* and 104*b* are charged. By checking if the capacitor 104*a* is charged, it is possible to check if the connection made between the terminals 100*b* and 100*c* is correct. After having discharged the capacitors, the following wire is consumed in the same manner.

As has already been noted above, the junction panel can also be tested to insure that every marked terminal (which is connected to one of the wires 102) is free of other electrical connections before the required connection is made. This can be done by inserting the wire 102 and the capacitor 104 associated with a particular terminal in one arm of an alternating current bridge and comparing the measured value of the capacitance with a norm, which equals the actual value of the capacitor 104.

Care should be taken, in this connection, that this test be carried out before a connection is established with the particular terminal. This test should, therefore, be made before the terminal is optically marked. The same holds true if the terminal is also to be tested to insure that it is free of short circuits to ground. In this case, the conductor 106 is connected to ground and the capacitance between the wire 102 that is connected with the particular terminal and ground is checked to insure that the capacitance between the terminal and ground has the value of the associated capacitor 104.

The wires 102 may be connected with the terminals 100 with the aid of a single multiple plug. It is also possible to insert plug boards into the back side of the junction panel 1 which contain parts of the wires 102 as well as the capacitors 104. The cable which comes from the control switch 105, therefore, terminates in contact strips which may be inserted in the plug boards and which connect all the capacitors on the various plug boards together in parallel and to the testing device 103.

After all the terminals have been marked and connected, the junction panel 101 may be double-checked by again attaching the apparatus of FIG. 7 to all the terminals. It is possible to use the same paper tape as was used to test the junction panel during wiring to test all the terminals thereof to which a connection has been made. A new testing paper tape must be produced, however, to check the terminals which have not been connected.

The check to determine if the single capacitors have a charge is performed best by means of indicators which have a highly resistant input. For the purpose of charge-checking, it is possible to switch the capacitor which is to be checked to a direct current amplifier with high input impedance. This direct current amplifier controls, for example, a relay which is operated when the capacitor has sufficient voltage. By its operation, it causes the control device to switch to the next instruction of the program.

The check to determine if the capacity which is measurable at one terminal is equal to the nominal value, can be performed by means of a bridge which is, when the capacitor which is to be checked is not yet connected to the bridge, always unbalanced in such a manner that the indication diagonal of the bridge has always direct current voltage of a certain polarity. If for the checking a capacitor is switched into one of the bridge-branches and the capacity of that capacitor is at least equal to the nominal value, then the bridge should be unbalanced in such a manner that the direct current voltage in the indication diagonal changes its polarity. The change of the polarity is registered as a positive result of measurement and used for switching to the next instruction in the program. Therefore, it is at once necessary that the bridge be dimensioned in such a manner that it gives a positive result of measurement if a terminal is connected to the bridge at which terminal lies only an associated capacitor. If, on the contrary, a terminal connected to the bridge at which, because of the connection wire to other terminals, other capacitors are connected in parallel with the associated capacitor, a positive result of measurement may then only occur if the measured capacity is at least equal to the double of the capacity of the capacitors associated at the single terminals. Therefore, it is necessary (and done under control of the paper tape) to switch over the bridge, that is to change the reference capacity, if at first the capacity of one capacitor and then the capacity of several capacitors connected in parallel must be measured and vice versa.

It will be understood that the above description of the present invention is susceptible to various modifications, changes and adaptations.

We claim:

1. In a method of making electrical connections between individual terminals on a junction panel having a plurality of terminals, the steps of:

(a) viewing, via at least one at least partly reflective mirror, the junction panel or an image thereof; and (b) superimposing on the view or image of the junction panel an image of an optical marking which substantially coincides with the view or image of at least one of the terminals which is to be electrically connected.

2. The method defined in claim 1, wherein said at least one mirror is a partly reflective mirror and said junction panel is viewed through said mirror.

3. The method defined in claim 2, wherein said image of said optical marking is viewed in said mirror.

4. The method defined in claim 1, wherein said at least one mirror includes a substantially wholly reflective mirror and the image of said junction panel is viewed in said mirror.

5. The method defined in claim 4, wherein said image of said optical marking is viewed in said wholly reflective mirror.

6. The method defined in claim 1, wherein said optical markings are illuminations.

7. The method defined in claim 1, further comprising the step of optically marking one bin of a plurality of bins, each of said bins containing wires for the connection of said terminals, said one bin containing wires having the proper length for connection to said at least one terminal which is to be electrically connected.

8. The method defined in claim 1, wherein said optical marking additionally coincides with the view or image of at least a part of the desired path of the wire to be connected to said at least one terminal.

9. The method defined in claim 1, wherein said junction panel is a circuit chassis and said terminals are to be provided with circuit elements.

10. The method defined in claim 1, further comprising the step of automatically controlling the positions of a successive series of said image of said optical marking with stored instructions.

11. Apparatus for use in making electrical connections between individual terminals on a junction panel having a plurality of terminals, comprising, in combination:

(a) at least one at least partly reflective mirror via which the junction panel, or an image thereof, may be viewed;

(b) means for producing an optical marking, said means being arranged, with respect to said at least one mirror, so that an image of said optical marking will be superimposed on the view or image of the junction panel and substantially coincide with the view or image of at least one of the terminals which is to be electrically connected.

12. The apparatus defined in claim 11, wherein said at least one mirror is a partly reflective mirror and is arranged so that the junction panel may be viewed therethrough.

13. The apparatus defined in claim 12, wherein said means is arranged so that the image of the optical marking may be viewed in said mirror.

14. The apparatus defined in claim 11, wherein said at least one mirror includes a substantially wholly reflective mirror and is arranged so that the image of the junction panel may be viewed in said wholly reflective mirror.

15. The apparatus defined in claim 14, wherein said means is arranged so that the image of the optical marking may be viewed in said wholly reflective mirror.

16. The apparatus defined in claim 11, wherein said at least one mirror includes, in combination:

(1) a substantially wholly reflective first mirror, and (2) a partly reflective second mirror, said first and second mirrors being arranged so that the junction panel is reflected from said second mirror and forms an image in said first mirror and the optical marking passes through said second mirror to form an image in said first mirror.

17. The apparatus defined in claim 11, wherein said means for producing an optical marking includes, in combination:

(1) an orifice plate having a plurality of apertures, one for each of the terminals of the junction panel which are to be marked, said plate being arranged in a position facing the junction panel, and each of said apertures being arranged in said plate in a position facing one of the terminals of the junction panel which are to be marked;

(2) a plurality of electric lights, one for each of said apertures, each of said lights being arranged in one of said apertures; and (3) means for selectively applying voltage to individual ones of said lights, thereby to illuminate the light associated with the terminals to be marked.

18. The apparatus defined in claim 17, wherein said terminals, said apertures and said lights are arranged in columns and rows, and wherein said means for selectively applying voltage applies a voltage to all lights in the column and row of the light associated with a terminal to be marked, thereby to mark said terminal at the point at which an illuminated column crosses an illuminated row.

19. The apparatus defined in claim 11, wherein said means for producing an optical marking includes, in combination:

(1) a source of light;

(2) means, connected to said source of light, for automatically moving said source of light to prescribed positions.

20. The apparatus defined in claim 19, wherein said means for moving said source of light includes programmable control means, for serially executing program instructions which defined the prescribed positions.

21. The apparatus defined in claim 19, wherein said means for moving said source of light includes means for moving said source in one coordinate direction and means for moving said source in another coordinate direction, said other coordinate direction being perpendicular to said one coordinate direction.

22. The apparatus defined in claim 21, wherein said means for moving said source of light includes at least one motor.

23. The apparatus defined in claim 22, wherein said at least one motor is in continuous operation, and wherein said means for moving said source in each of the coordinate directions include drive-train means connected to be driven by said at least one motor including, in combination:

(i) shaft means rotatable in two directions for moving said source in one linear direction when rotating in one direction and moving said source in the opposite direction when rotating in the other direction;
(ii) first wheel means driven by said motor to rotate on said shaft in said one direction;
(iii) second wheel means driven by said motor to rotate on said shaft in said other direction;
(iv) first clutch means for selectively connecting said first wheel means to said shaft; and
(v) second clutch means for selectively connecting said second wheel means to said shaft.

24. The apparatus defined in claim 23, wherein said means for moving said source in said one coordinate direction and said means for moving said source in said other coordinate direction each further include a Wheatstone bridge having four resistance bridge arms, means for varying the resistance of one of said bridge arms in dependence upon the position of said light source and means connected across said bridge and to said first and second clutch means for varying the position of said light source in dependence upon the voltage appearing across said bridge.

25. The apparatus defined in claim 24, further comprising control means for varying the resistance of a second of said bridge arms of each said Wheatstone bridge in dependence upon a series of program instructions.

26. The apparatus defined in claim 25, wherein said means for varying the position of said light source includes a difference amplifier means, connected across a diagonal of said bridge, for actuating one of said first and second clutch means in response to a voltage of one polarity, actuating the other of said first and second clutch means in response to a voltage of the other polarity, and actuating neither said first nor said second clutch means when said bridge is balanced.

27. The apparatus defined in claim 26, wherein said means for moving said source in said one coordinate direction and said means for moving said source in said other coordinate direction each further include magnetic brake means, connected to said difference amplifier means, for braking the rotation of said shaft means in dependence upon an approximate balance of said bridge.

28. The apparatus defined in claim 27, wherein said means for moving said source in said one direction and said means for moving said source in said other direction each further include means for manually further varying the resistance of said one of said bridge arms for varying the distance between adjacent positions of said light source.

29. The apparatus defined in claim 28, wherein said means for moving said source in said one direction and said means for moving said source in said other direction each further include means for manually further varying the resistance of said second bridge arm for varying the distance between adjacent positions of said light source.

30. The apparatus defined in claim 29, wherein said means for moving said source in said one direction and said means for moving said source in said other direction each further include means for manually varying the resistance of at least one of the third and fourth arms of said bridge.

31. The apparatus defined in claim 19, wherein said light source produces a flashing light.

32. The apparatus defined in claim 20, for use in making electrical connections between individual terminals on a plurality of junction panels, each having a plurality of terminals, wherein there are a plurality of said sources of light, one for each junction panel, mechanically joined together and one means, connected to said sources of light, for automatically moving said sources of light together, and wherein said programmable control means includes means for switching said sources of light on and off in response to program instructions, thereby to optically mark the terminals of selected ones of said plurality of junction panels.

33. The apparatus defined in claim 16, wherein said first mirror, said second mirror and said means for producing an optical marking are arranged, with respect to the junction panel, such that the plane of said image in said first mirror of said optical marking falls, at least approximately, in the plane of said image of the junction panel in said first mirror.

34. A device for use in making electrical connections between individual terminals of a plurality of junction panels, each having a plurality of terminals, comprising a plurality of the said apparatus defined in claim 11, one of said apparatus being arranged for use with a respective one of the junction panels.

35. The apparatus defined in claim 11, wherein the electrical connections are made on one side of the terminals while the other side of the terminals is free of connections, said apparatus further comprising, in combination:

(c) programmable control means, connected to said optical marking means, for serially executing program instructions which define which of said terminals are to be marked; and
(d) testing means, connected to said control means and to said other side of each of the terminals, for applying a voltage between selected ones of the terminals and initiating the execution of the next program instruction upon the presence of current flow between the selected terminals, thereby to continue the optical marking of the terminals only after the selected terminals have been properly connected.

36. The apparatus defined in claim 35, wherein said testing means initiates the execution of the next program instruction only if said current flow exceeds a prescribed threshold.

37. The apparatus defined in claim 11, further comprising means, connected to said optical marking means, for testing whether an electrical connection has been made to the correct terminal and initiating the optical marking of a successive terminal when the result of such test is positive.

38. The apparatus defined in claim 37, wherein said testing means includes means for applying a voltage between a wire which has been connected to a terminal and the terminal to which the wire should have been connected, and for initiating the optical marking of the next successive terminal upon the presence of a current.

39. The apparatus defined in claim 38, wherein said testing means includes programmable control means, connected to said means for applying a voltage, for automatically connecting said voltage-applying means to a said terminal to which the wire should have been connected.

40. The apparatus defined in claim 39, wherein said means for applying a voltage includes a test probe, which may be manually placed against the wire which has been connected to a terminal, for establishing an electrical connection with such wire.

41. The apparatus defined in claim 39, wherein said means for applying a voltage includes a Wheatstone bridge having the wire which has been connected to a terminal and the terminal to which the wire should have been connected in one arm thereof and having means for initiating the optical marking of the next successive terminal upon the presence of a condition of balance.

42. The apparatus defined in claim 41, wherein said bridge is a resistance bridge and said one arm of said bridge includes at least one resistor.

43. The apparatus defined in claim 11, further comprising, in combination:

(a) a plurality of capacitors, one side of each of said capacitors being connected to a respective one of the terminals of the junction panel;

(b) means, connected to said one side and to the other side of each of said capacitors, for placing a charge on at least one of said capacitors and testing for the presence of said charge at said one side of at least one other of said capacitors, thereby to test the connections made between the terminals.

44. The apparatus defined in claim 43 comprising in combination:

(a) means for charging the capacitor, connected to that terminal, which out of two or more terminals to be connected with one wire is at first marked;

(b) means for testing for the presence of said charge on the capacitor of a following marked terminal, after having connected the wire to that terminal;

(c) and means to initiate the optical marking of the next successive terminal, when the result of such test is positive.

45. The apparatus defined in claim 44, wherein a wire is connected to three or more terminals and said testing means are further operative to recharge the capacitors connected in parallel, after the presence of said charge has been tested, if the presence of said charge is to be tested again to test the connection of one of such terminals with another terminal.

46. The apparatus defined in claim 43 comprising in combination:

(a) means for charging the capacitor connected to the terminal marked at the second or following place (within the marking of the terminals to be connected to one wire) and also the capacitors being just connected in parallel by the wire;

(b) means for testing for the presence of said charge at the capacitor of the terminal marked at first;

(c) and means for discharging the capacitors after each test.

47. The apparatus defined in claim 43, wherein each connection with a terminal is tested after all the connections have been made in the junction panel.

48. The apparatus defined in claim 43, wherein said means (b) is further operative to test the value of capacitance at a terminal and compare said value with the known value, thereby to test whether the one terminal is connected to any other terminal or not.

49. The apparatus defined in claim 48, wherein said testing means is further operative to connect said other side of all said capacitors to ground, test the capacitance between a one of the terminals and ground before a wire connection is made to the one terminal, and compare said value with the known value of the capacitor connected to the one terminal, thereby to test whether the one terminal is short-circuited to ground.

50. The apparatus defined in claim 48, wherein each terminal which should not have been connected is tested for the presence of a connection after all the connections have been made in the junction panel.

51. The apparatus defined in claim 43, wherein said means (b) is further operative to remove the charge on said at least one of said capacitors after the presence of said charge has been tested, thereby to leave all of said capacitors uncharged when said junction panel has been wired.

52. The apparatus defined in claim 48, wherein means (b) is further operative to test the value of capacitance connected to a one of the terminals after said one terminal has been wired to at least one other of the terminals and compare said value with the known value of the capacitance that should be connected to said one terminal, thereby to test the correctness of the wiring of the terminals.

53. The apparatus defined in claim 43, wherein the means for testing the charge consist of an indicator (for example direct-current amplifier) with highly resistive input.

54. The apparatus defined in claim 48, wherein the means for testing the value of capacitance consist of a bridge, which is unbalanced and provides in its indicating diagonal a direct voltage of a certain polarity when no capacitance to be tested is connected into a bridge-branch and which is also unbalanced and provides a direct voltage of the other polarity, if the capacitance to be tested and being connected to the bridge has a value of at least the nominal value, the changing of the polarity of the direct voltage is used as a positive result.

References Cited

UNITED STATES PATENTS

| | | | |
|---|---|---|---|
| 2,805,471 | 9/1957 | Lowden | 29—625X |
| 2,906,016 | 9/1959 | Cannon, Jr., et al. | 29—407 |
| 2,959,848 | 11/1960 | Savitt | 29—626X |

THOMAS H. EAGER, Primary Examiner

U.S. Cl. X.R.

29—407, 626